United States Patent [19]

Cripe et al.

[11] Patent Number: 4,813,555
[45] Date of Patent: Mar. 21, 1989

[54] VEHICLE COUPLER FOR CONNECTING TWO OR MORE CONVERTIBLE RAIL-HIGHWAY VEHICLES END-TO-END

[76] Inventors: Alan R. Cripe, 4511 Menokin Rd., Richmond, Va. 23225; Christopher A. Cripe, 1903 Escourt Dr., Coatesville, Pa. 19320

[21] Appl. No.: 16,207

[22] Filed: Feb. 18, 1987

[51] Int. Cl.⁴ .............................................. B61G 5/06
[52] U.S. Cl. ........................................ 213/76; 105/4.1
[58] Field of Search ............... 105/4.3, 34.1; 213/75, 213/76, 69; 114/250

[56] References Cited

U.S. PATENT DOCUMENTS

| | | | |
|---|---|---|---|
| 1,637,099 | 7/1927 | Barrows | 213/69 |
| 2,677,472 | 5/1954 | Larsson | 213/76 |
| 2,843,056 | 7/1958 | Browne | 105/4.3 |
| 2,925,791 | 2/1960 | Browne et al. | 213/75 R |
| 2,963,986 | 12/1960 | Dobson | 213/75 R |
| 3,396,673 | 8/1968 | Livelsberger et al. | 213/75 R |
| 3,399,631 | 9/1968 | Weber | 213/75 R |
| 3,646,604 | 2/1972 | Tack et al. | 105/4.3 |
| 3,684,105 | 8/1972 | Scharfenberg | 213/69 |
| 3,800,733 | 4/1974 | West | 114/250 |
| 4,258,628 | 3/1981 | Altherr | 105/4.3 |
| 4,336,758 | 6/1982 | Radwill | 213/75 R |
| 4,456,133 | 6/1984 | Altherr et al. | 213/75 R |

Primary Examiner—Joseph F. Peters, Jr.
Assistant Examiner—Je us D. Sotelo
Attorney, Agent, or Firm—Staas & Halsey

[57] ABSTRACT

A coupling system for connecting convertible rail-highway vehicles which are adapted to operate on highways as conventional semi-trailers as well as on railway tracks in an articulated rail mode. The coupling system enables automatic coupling of vehicles when a vehicle is backed into a stationary vehicle and the transmission of large forces due to compression and tension in long trains while permitting the requisite movements of relative roll, pitch and yaw at a point between end faces of the coupled vehicles.

19 Claims, 5 Drawing Sheets

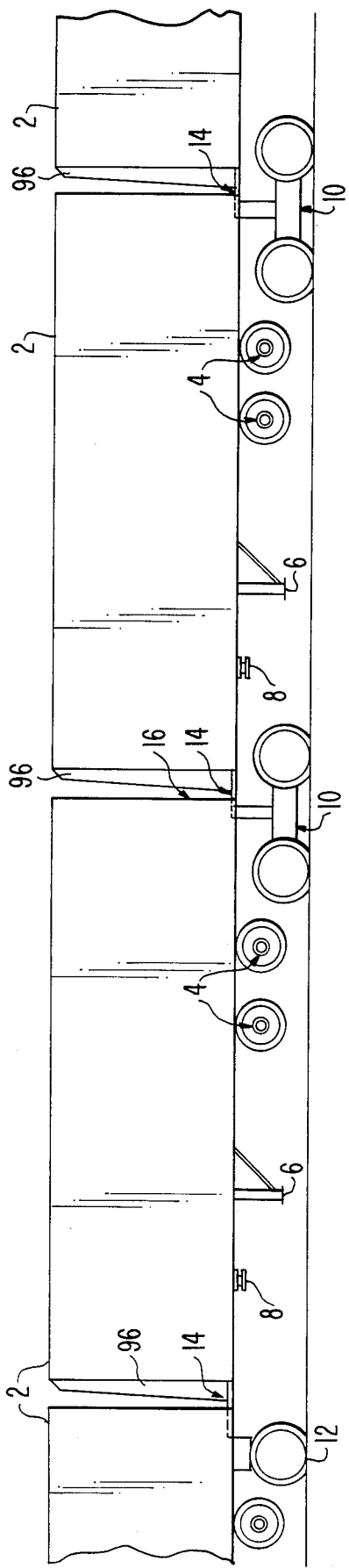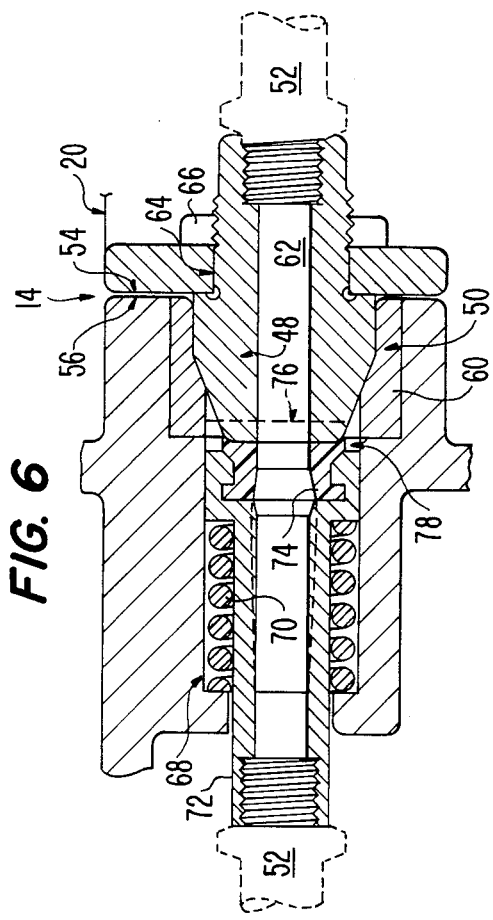

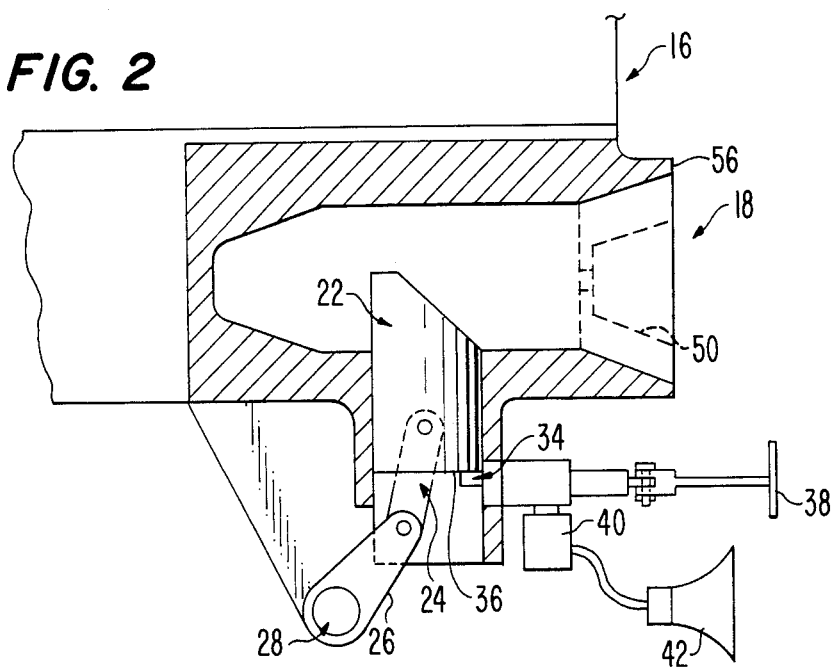
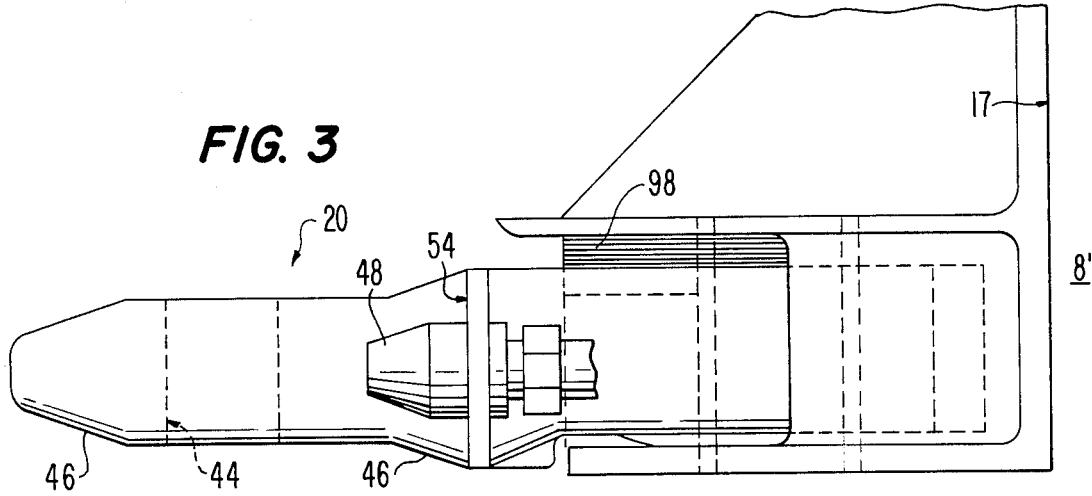

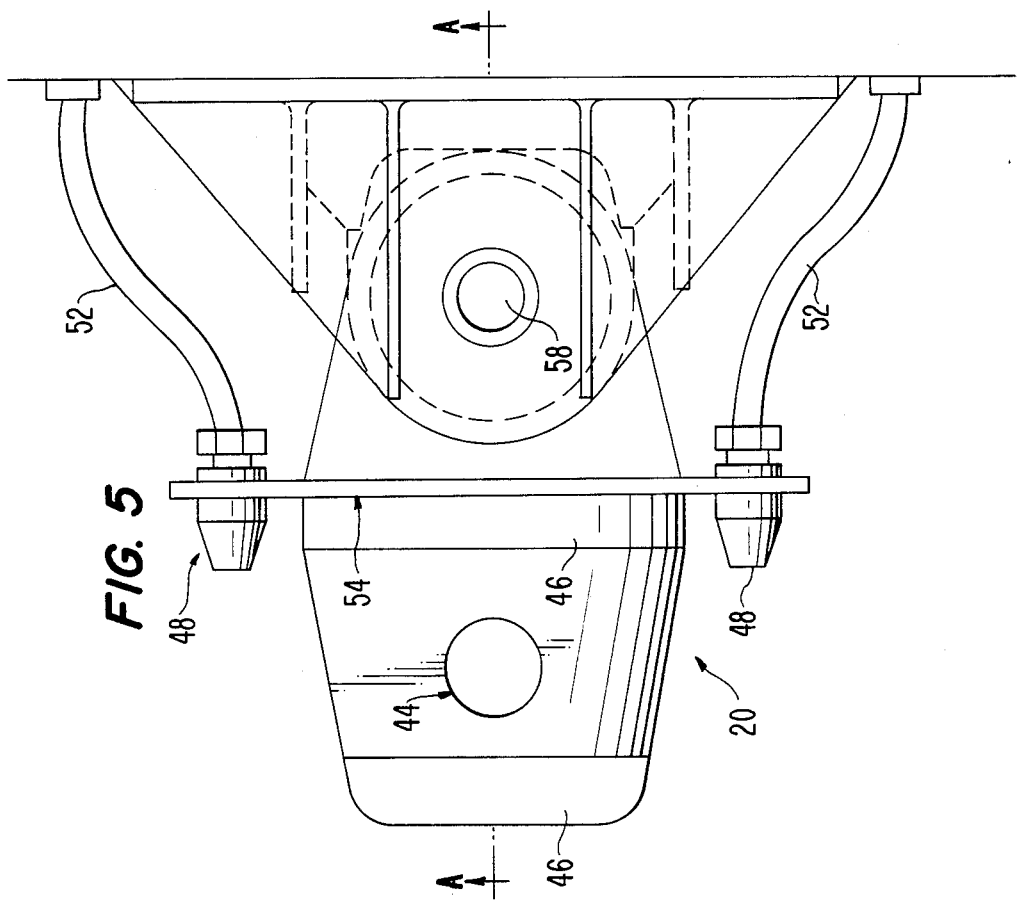
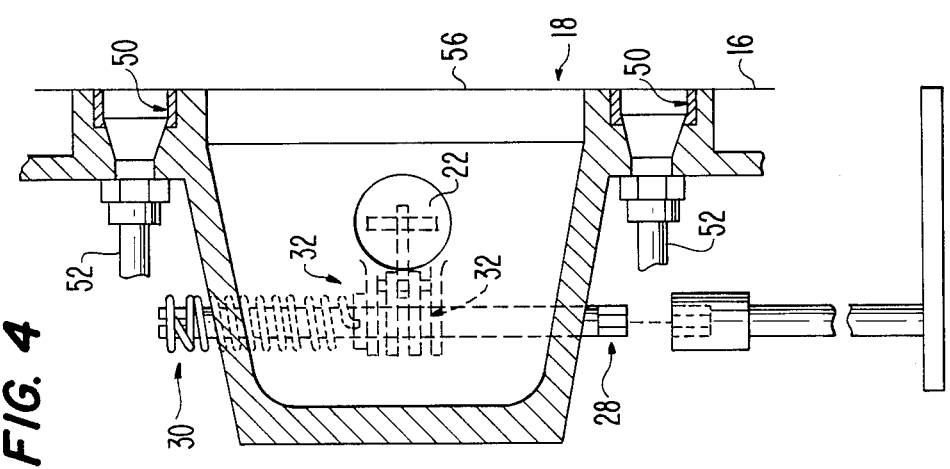

VEHICLE COUPLER FOR CONNECTING TWO OR MORE CONVERTIBLE RAIL-HIGHWAY VEHICLES END-TO-END

BACKGROUND OF THE INVENTION

The present invention relates to a coupler and, more particularly, to a coupler for articulated convertible rail-highway vehicles which are adapted to operate on highways as conventional semi-trailers as well as on railway tracks in an articulated train mode.

Couplers for connecting articulated convertible rail-highway vehicles are known generally as for example is shown in U.S. Pat. Nos. 2,925,791, 4,202,454 and 4,311,244. Couplers which are similar to couplers for convertible rail-highway vehicles are also known as for example is shown in U.S. Pat. Nos. 1,848,956, 2,677,472, 2,812,726, 2,816,517, 2,843,056, 2,963,986, 3,396,673, 3,399,631, 3,476,040, 3,646,604, 3,716,146, 4,258,628, 4,336,758, 4,456,133 and 4,593,828.

The provision of couplers for convertible rail-highway vehicles presents a number of considerations that are not necessary or at least not imperative when providing couplers for railroad cars. In particular, couplers for articulated convertible rail-highway vehicles must not interfere with the conventional tractor-trailer geometry and must permit utilization of the full cubic capacity of the semi-trailer within legal height and length limitations. For example, the coupler must be able to support the weight of the front of the following vehicle in an articulated configuration without high structural bending stresses. Thus, such a coupler must be strong enough to withstand train tension and compression forces of 400,000 lbs or more. However, the coupler must be shallow so that it can easily pass over the fifth wheel of an associated tractor while not extending above the floor of the trailer body.

Such a coupler should also enable automatic coupling of first and second vehicles so that an operator need not be present during the coupling operation. It would also be desirable to provide a coupling assembly which will gather the vehicles together when the couplers are slightly misaligned before coupling while providing slack free, i.e. tight, connection so that loads and forces can be transmitted about all axes.

A further advantageous characteristic of a coupler for articulated convertible rail-highway vehicles would be a structure which permits roll, pitch and yaw motions to be taken at a point between the end faces of the coupled vehicles so that the vehicle frames are not unduly stressed while operating in the rail mode. It would further be desirable to provide couplers that are capable of providing at least limited shock absorption in the coupler mounting to attenuate longitudinal shock loads during coupling operations and/or when a semi-trailer is coupled to a tractor for operation in the highway mode. Yet another desirable characteristic would be the ability to automatically connect air brake lines or other service or power lines between vehicles so that no separate coupling operation is required.

While couplers for articulated convertible rail-highway vehicles are known, a coupler exhibiting all the above-mentioned advantageous characteristics has not previously been developed. For example, in U.S. Pat. No. 4,202,454 a coupling assembly is shown which includes a female coupler and a male coupler. The female coupler is provided in the rear sill structure of a convertible rail-highway vehicle and includes a pin which passes through a corresponding aperture provided in the male coupler so as to lock the male coupler within the female coupler. The coupling assembly of this patent permits relative roll, pitch and yaw motions between the coupled vehicles by providing a spherical bearing within the male coupler through which the locking pin passes. Thus, in this coupling assembly, relative motion of the vehicles is carried within the rear sill structure of the forward vehicle. U.S. Pat. No. 4,311,244 is substantially similar to the '454 patent but further includes an actuating pin which is engaged by the male coupler during the coupling operation and releases the locking pin so that it may lock the male coupler within the female coupler.

It has been found that the foregoing couplers are not entirely advantageous when utilized to connect convertible rail-highway vehicles. More particularly, the '454 patent requires that an operator be present to move the locking pin both into and out of engagement with the male coupler. Further, both these couplers, while permitting relative movement between the vehicles, carry relative movement within the rear sill structure of the leading vehicle and, thus, the male coupler element is subjected to a great deal of stress.

SUMMARY OF THE INVENTION

It is the primary object of the present invention to provide a coupling system which exhibits the above-mentioned desirable characteristics by enabling the automatic coupling of vehicles when a vehicle is backed into a stationary vehicle and the transmission of large forces due to compression and tension in long trains while permitting the requisite movements of relative roll, pitch and yaw at a point between end faces of the coupled vehicles. More particularly, the present invention provides a "slack free" connection so that there is no impacting of components due to loose fitting parts when longitudinal forces reverse and so that loads and forces can be transmitted about all axes.

Another object of the present invention is to permit couplers to engage and "gather" the vehicles together should the couplers be slightly misaligned before coupling.

A further object of the present invention is to enable one or more air lines used for braking air supply or control purposes to be automatically coupled when the vehicle couplers engage and lock together.

Yet another object of the present invention is to provide for a limited shock absorption in the coupler attachment so as to attenuate longitudinal shock loads during coupling operations and when a trailer is being coupled to a tractor for highway mode operation.

Another object of the invention is to reduce the bending stresses in the male coupler by moving the point of articulation to a location between the vehicle bodies.

A further object of the present invention is to permit the coupling and uncoupling of vehicles by a simple mechanical operation whereby an audible signal is emitted during the period that the coupler is unlocked.

The foregoing objects are realized with the coupling assembly of the present invention which comprises a female coupler, a male coupler, means for automatically locking the male connector within the female coupler in a tight fitting relation when the male coupler is inserted into the female coupler and means for automatically coupling fluid hoses carried by the female coupler and the male coupler when same are coupled together. The male coupler further includes means for permitting relative roll, pitch and yaw movements between vehicles at a point of articulation spaced longitudinally from the female coupler and means for absorbing forces imposed on the male coupler during coupling operations.

In a preferred embodiment, the female coupler further includes a rearward opening having inclined faces so as to permit gathering of the couplers when they initially engage one another. Additionally, a pin is preferably provided in the female coupler that must be retracted before the couplers can be separated and when retracted, an audible signal is emitted to indicate the couplers can be or are separated.

BRIEF DESCRIPTION OF THE DRAWINGS

Other objects, features, and characteristics of the present invention, as well as the methods of operation and functions of the related elements of this structure, and the combination of parts and economies of manufacture, will become more apparent upon consideration of the following description and the appended claims with reference to the accompanying drawings, all of which form a part of this specification, wherein like reference numerals designate corresponding parts and the various figures, wherein:

FIG. 1 is a diagrammatic elevational view of a plurality of articulated convertible rail-highway vehicles coupled together so as to form a train;

FIG. 2 is a side elevation, partly in cross section, view illustrating a female coupler formed in accordance with the present invention;

FIG. 3 is a side elevation view illustrating a male coupler formed in accordance with the present invention;

FIG. 4 is a horizontal cross-sectional view of a female coupler formed in accordance with the present invention;

FIG. 5 a top plan view of the male coupler of FIG. 3;

FIG. 6 a cross-sectional view of the couplers coupled together showing the details of the automatic coupling for control lines formed in accordance with the present invention;

DETAILED DESCRIPTION OF THE PRESENTLY PREFERRED EXEMPLARY EMBODIMENT

Figure 7:
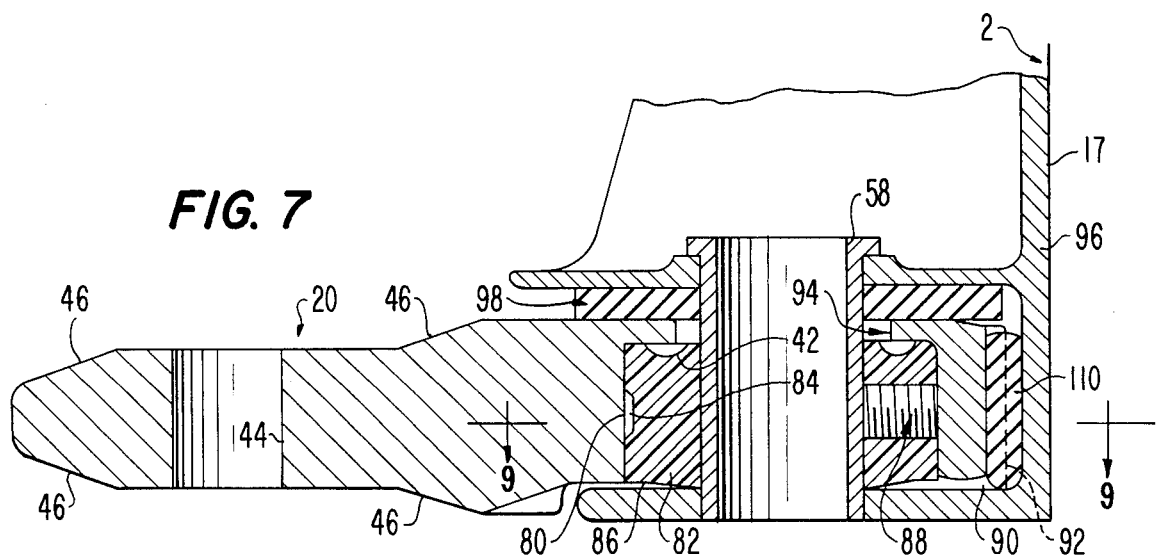
FIG. 7 is a cross-sectional view, partly broken away for clarity, showing a first embodiment of a mounting structure for the male coupler as taken along line A—A of FIG. 5.

Referring to FIG. 1, a number of convertible rail-highway vehicles are shown coupled together so as to form a train. Each vehicle includes a main body portion 2, retractable highway wheels 4, a trailer type landing gear 6, a standard trailer kingpin 8, a railroad suspension system of the fixed or removable dual axle bogie type 10, or a single axle, fixed or removable type 12, and a coupler system 14 formed in accordance with the present invention connecting the vehicle bodies.

Referring more particularly to FIGS. 2-4, the rear 16 of each vehicle body 2 includes a slotted rectangular opening or female coupler 18 which receives an associated male coupler 20, which will be more fully described below. Female coupler 18 includes a coupler locking pin or latch 22 which is held in an upward position by means of linkage 24. Linkage 24 is operated by a crank 26 on a shaft 28 which is biased torsionally counterclockwise by torsion spring 30 attached to shaft 28 and to the female casting member at 32. When coupler locking pin or latch 22 is in its upward or locked position as shown in FIG. 2, a spring loaded safety locking pin 34 engages under the lower edge 36 of coupler locking pin 22 so as to prevent downward movement or disengagement of coupler locking pin 22. However, safety locking pin 34 may be manually disengaged from the lower edge 36 of coupler locking pin 22 by pulling a "T" handle 38. In the illustrated embodiment safety locking pin 34 and "T" handle 38 are positioned so as to extend longitudinally toward the rear of the vehicle. However, in the most preferred embodiment such a safety pin and handle would be provided so as to extend to the side of the vehicle so as to be readily accessible by one releasing same and so as to not interfere in any way with the coupling of the vehicles.

Safety locking pin 34 further operates a cam which opens an air valve 40 such as a Bendix RD-1 valve, which allows air to flow from the vehicle main air reservoir (not shown) to a horn 42. In this manner, when handle 38 is pulled so as to withdraw safety pin 34, horn 42 emits an audible warning so that those involved in the coupling and uncoupling operation are aware that coupler locking pin 22 is not locked by safety pin 34 and that coupler 18 is ready for coupling or uncoupling.

Male coupler 20 is shaped so as to fit the cavity of female coupler 18 so that no relative movement can take place when the male and female parts are fully engaged. Alignment pins 48 provide the final precise fit and carry the vertical and torsional loads from male coupler 20 to the female coupler structure through sockets 50. Compression loads are carried through mating coupler faces 54 and 56 while tension loads are carried through coupler locking pin 22. Further, male coupler 20 includes a large diameter hole 44 (shown in phantom in FIG. 3) which is adapted to receive coupler locking pin 22. As can be further seen in FIG. 2, the upper surface of locking pin 22 is sloped so as to allow male member 20, upon engagement therewith, to depress locking pin 22 until spring 30 (FIG. 4) turns shaft 28 and drives pin 22 upwards to lock male coupler 20 within female coupler 18.

To permit easy engagement of the couplers when some initial misalignment is present before coupling vehicle bodies 2 together, male coupler 20 is tapered as at 46 both in plan and elevation so that initial and final engagement can take place without binding. Female coupler 18 is similarly shaped so that the aforementioned tight coupling of the male and female members is possible. When the male and female couplers are so engaged, alignment pins 48 on male coupler 20 engage corresponding sockets 50 in female coupler 18 so as to automatically couple fluid lines such as air hoses 52 of the vehicles, as will be described more fully below with reference to FIG. 6.

When the male and female parts are coupled and locked, vertical shear loads transmitted through coupler assembly 14 (FIG. 1) are carried by the tapered surfaces 46 and by alignment pins 48. Transverse loads similarly are carried by alignment pins 48 while longitudinal tension forces are carried by coupler pin 22 engaging hole 44 in male coupler 20. Finally, longitudinal compression loads are carried through coupler faces 54 and 56.

The coupler of the present invention further provides for relative roll, pitch and yaw motions to be taken at a point between the vehicles about a pin 58 located just ahead of the forward wall 17 of each vehicle and securely attached thereto, as will be described more fully below with reference to FIGS. 7-9.

Turning now to FIG. 6, it can be seen that alignment pins 48 and sockets 50 serve the further function of automatically connecting air hoses 52 between vehicles. Each socket 50 is preferably fitted with a hardened steel bushing 60 into which alignment pins 48 fit. Alignment pins 48 are tubular with a large internal air passage 62 and are preferably mounted to male coupler 20 by press fitting into holes 64 in the face of the male coupler and securing with lock nuts 66. On the female coupler, a counterbore or hole 68 provides a seat for spring 70 and sleeve 72 which connect to air line 52 at one end and a rubber compression seal 74 at the other end. The spring mounted sleeve 72 is disposed so as to move from a position 76 (shown in phantom lines in FIG. 6) when uncoupled to a position 78 (shown in solid lines in FIG. 6) when coupled. Thus, the sleeve 72 and rubber compression seal 74 provide positive pressure on alignment pin 48 for passage of air to passage 62 without leakage.

While in the illustrated embodiment pins 48 and sockets 50 are used to couple air lines between vehicles, it is to be understood that such connections could be provided to couple one or more control lines other than air lines such as but not limited to electrical lines and/or fiber optic cables.

Figure 8:
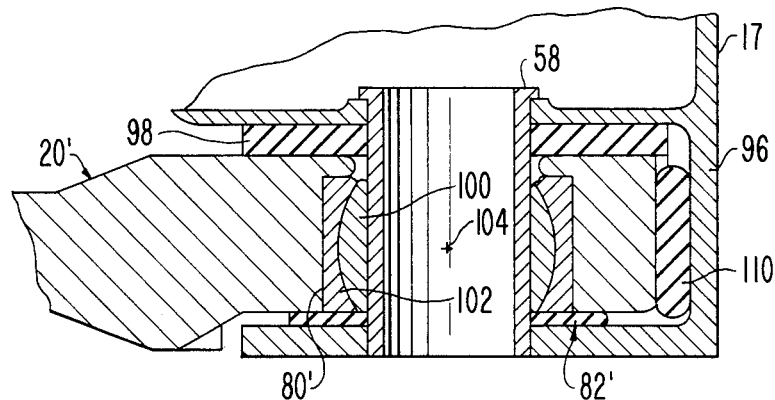
FIG. 8 is a cross-sectional view, partly broken away for clarity, of a second embodiment of a mounting structure for the male coupler as taken along line A—A of FIG. 5.
Figure 9:
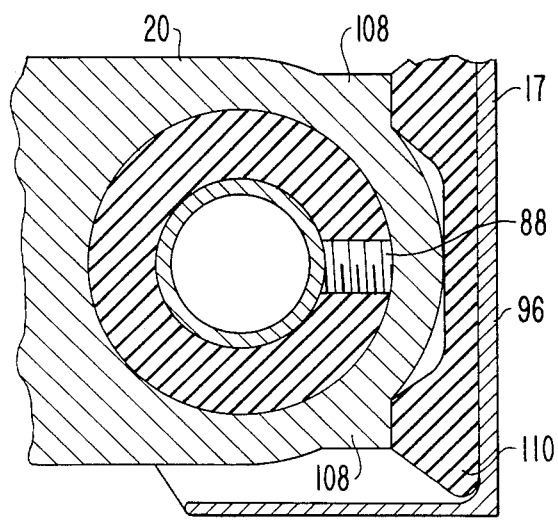
FIG. 9 a cross-sectional view taken along line 9—9 of FIG. 7.
Figure 10:
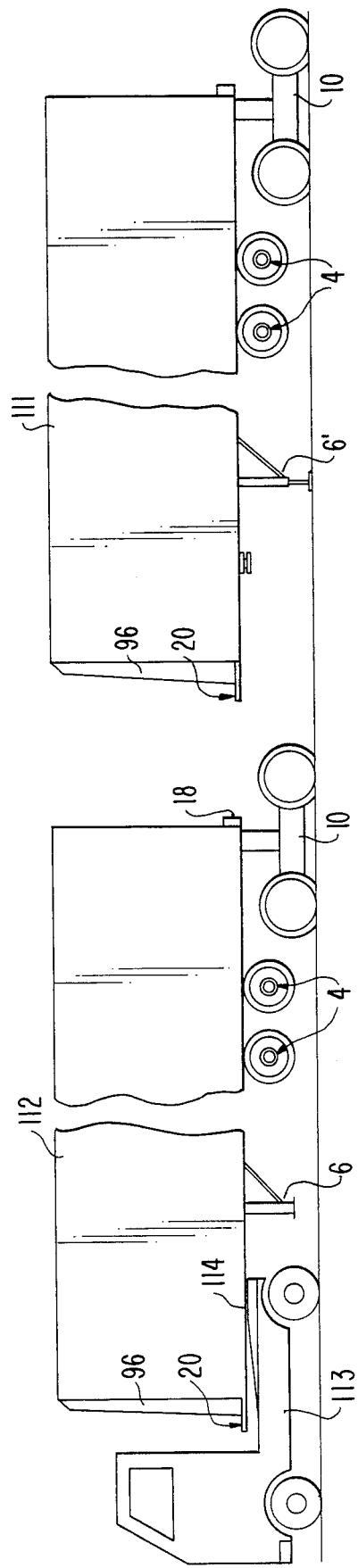
FIG. 10 is a diagrammatic elevational view of the manner in which adjacent vehicles are coupled together.

Turning now to FIGS. 7-9, the male coupler 20 is shown in greater detail. Preferably a high strength casting, the male coupler includes tapered surfaces 46 and locking pin bore 44 at one end and a large annular bore 88 at the other end. Male coupler 20 is coupled by means of a pin 58 to an attachment structure 96 mounted on the forward end of vehicle body 2. While pin 58 may be made of any suitable material, in the preferred embodiment pin 58 is a tubular steel pin. Further, as can be seen in FIGS. 1 and 10, attachment structure 96 extends upwardly on the front of vehicle body 2 substantially the entire height thereof. Thus, attachment structure 96 not only provides a structural support for male coupler 20 but also acts as an air dam to prevent cross flow of air when cross winds are encountered during operation in the rail mode. Accordingly, structure 96 reduces the aerodynamic resistance of a train of vehicle bodies 2.

In accordance with a first embodiment of the present invention, shown in FIG. 7, annular bore 80 is adapted to receive an elastomeric shock bushing 82 which is preferably made of a resilient high damping material such as DuPont's Hytrel elastomer molded in a form which includes relief grooves 84 and a free space 86 at the bottom and allows for roll and pitch movements without metal to metal contact between male coupler 20 and attachment structure 96.

Within bushing 82, a cylindrical bore 88 is defined which is oriented longitudinally of vehicle body 2 and filled with a high strength rubber laminated shock pad such as "Fabreeka" or a stainless steel wire shock pad which prevents any appreciable extension movement of the coupler while the vehicles are under tension yet permits, together with an elastomeric pad 110, discussed more fully below, limited compressive movement from a normal no load or a tension load position as shown at 90 to a position 92 (shown in phantom lines). The provision of such a shock pad cushions coupling impacts. As is apparent, bore 94 in the top of male coupler 20 is enlarged sufficiently to accommodate the movements of the coupler with respect to pin 58.

Interposed between the top of male coupler 20 and attachment structure 96 is an elastomeric shock pad or laminated pad 98 such as "Fabreeka" which carries the vertical load of the front of each vehicle body 2 through to the male coupler 20. Pad 98 allows rotational movement as the vehicle goes through horizontal curves and limited movement for pitching movements and relative roll between vehicles. Further, during coupling to highway tractors, if coupler 20 is inadvertently struck by the tractor fifth wheel, shock pads 88 and 98 cushion the contact forces and protect male coupler 20 from high bending stresses and physical damage.

Turning now to FIG. 8, an alternate embodiment of the attachment and bushing system of male coupler is shown which includes a "monoball" connection. In this embodiment, pin 58 is connected to male coupler 20' by means of a monoball consisting of an inner member 100 with a cylindrical bore and an outer spherical surface as well as an outer member 102 with a spherical inner surface and a cylindrical outer surface so that all motions can take place about point 104, the center of the sphere. Elastomeric pad 98 in this embodiment, as in the embodiment of FIG. 7, positions the coupler, carries the vertical load of the front of the vehicle through support structure 96 and allows clearance for the various motions between vehicles. Further, bushing 82', preferably formed of Dupont's Hytrel elastomer, is provided to allow roll and pitch movements without metal to metal contact.

Regardless of whether the attachment mechanism of FIG. 7 or monoball mechanism of FIG. 8 is provided for the male coupler, the male coupler 20 is fitted with two lugs 108 as shown in FIG. 9 and an elastomeric pad 110 of Hytrel or similar material is interposed between coupler casting and support structure 96 so as to provide a centering force on the male coupler to position it so that its axis is parallel to the long dimension of the vehicle when it is not coupled.

As is apparent from the foregoing description, referring to FIG. 10, the coupler described herein is operated as follows:

When vehicles are to be coupled together to form a train the process begins with the rearmost vehicle 111 being positioned on its rail bogie 10, its highway wheels 4 retracted, and its landing gear 6' extended so as to support the front of the vehicle. The vehicle 112 to be coupled is also positioned on an associated rail bogie 10, with highway wheels 4 retracted, but the front end thereof is supported by a highway tractor or yard hostler tractor 113, equipped with a highway "fifth wheel" 114, preferably of the hydraulic type. Tractor 113 is backed up so that the vehicles are a few feet apart at which time the "T" handle 38 (FIG. 2) is pulled by an employee supervising the coupling operation. This withdraws safety pin 34 and horn 42 emits an audible warning that the coupler locking pin 22 is not locked and the vehicles may be coupled (or uncoupled). Then, tractor 113 is slowly backed up pushing vehicle 112 rearward until male coupler 20 fully engages with female coupler 18. The inclined faces 46 of male coupler 20 engage and depress coupler locking pin 22 to allow complete insertion of the male coupler 20 within the female coupler. When male coupler 20 is fully inserted, coupler locking pin 22 is disposed immediately beneath aperture 44 (FIG. 5) and spring 30 turns shaft 28, urging coupler locking pin 22 upwards to lock male member 20 within female member 18. Spring loaded safety pin 34 then extends under coupler pin surface 36, locking the coupler pin and stopping the air flow to the horn 42. As the couplers engage, alignment pins 48 are inserted into sockets 50 so as to make an airtight coupling of the air hoses 52 between vehicles. Any relative movements of pitch, roll or yaw are taken at a point of articulation between the vehicles at the male coupler attachment to support structure 96, bushings 98 and 82 cushioning any coupling impacts between the vehicles.

While the invention has been described in connection with what is presently considered to be the most practical and preferred embodiment, it is to be understood that the invention is not to be limited to the disclosed embodiment, but on the contrary, is intended to cover various modifications and equivalent arrangements included within the spirit and scope of the appended claims.

What is claimed is:

1. In a train of articulated convertible rail-highway vehicles each of which is equipped with control line terminal connectors, movably mounted highway wheels at a rearward end, and a movable support at the forward end, the improvement comprising a coupling assembly for joining the vehicles together and simultaneously automatically connecting the control line terminal connectors including:
   a rear, female coupler mounted to the rearward end of said vehicles;
   a rear, control line terminal connector mounted to the rearward end of said vehicles;
   a front, male coupler mounted to the forward end of said vehicles and including means for permitting relative roll, pitch and yaw between adjacent vehicles at a point spaced longitudinally from said female coupler when said vehicles are coupled together;
   a front, control line terminal connector mounted to the forward end of said vehicles;
   means for locking said male coupler within said female coupler in tight fitting relation when said male coupler is inserted into said female coupler; and
   said female coupler and said male coupler each including said rear and front control line terminal connectors, respectively, disposed such that when said female coupler and said male coupler engage and lock, said rear and front control line terminal connectors engage so as to enable communication between.

2. A coupling assembly as in claim 1, wherein said means for locking comprises a latch means mounted to said vehicles so as to be urged into an interior space defined by said female coupler and a first aperture defined in a forward end of said male coupler which receives said latch means when said male coupler is fully inserted within said female coupler.

3. A coupling assembly as in claim 2, wherein said forward end of said male coupler includes at least one tapered face to facilitate insertion of said male coupler into said female coupler.

4. A coupling assembly as in claim 2, wherein said latch means includes an inclined rearward face so that when said male coupler is inserted into said female coupler, said male coupler engages said inclined face and depresses said latch means thereby enabling full insertion of said male coupler into said female coupler.

5. A coupling assembly as in claim 2, wherein said male coupler is mounted to the forward end of aid vehicles by means of an attachment structure mounted to the forward end of said vehicles and including a pin received within a second aperture defined in a rearward end of said male coupler, and an elastomer shock bushing means disposed about said pin within said second aperture for absorbing shocks imposed on said male coupler during coupling operations.

6. A coupling assembly as in claim 2, wherein said male coupler is mounted to the forward end of said vehicles by means of an attachment structure mounted to a forward end of said vehicles and including a pin received within a monoball element pivotally rotatably disposed in a second aperture defined in a rearward end of said male coupler; said monoball element providing said means for permitting relative roll, pitch and yaw.

7. A coupling assembly as in claim 6, further comprising spring means for centering said male coupler relative to said attachment structure.

8. A coupling assembly as in claim 2, wherein said control line terminal connectors comprises at least one projecting pin element mounted to a first plate member provided on and extending laterally from said male coupler and at least one counterbore defined in a second plate member mounted adjacent to a rearward opening of said female coupler, each said pin element engaging a respective counterbore when said couplers engage and lock.

9. A coupling assembly as in claim 1, wherein said male coupler is mounted to the forward end of said vehicles by means of an attachment structure mounted to the forward end of said vehicles and including a pin received within a second aperture defined in a rearward end of said male coupler; and
   an elastomer shock bushing means disposed about said pin within said second aperture for absorbing shocks imposed on said male coupler during coupling operations.

10. A coupling assembly as in claim 1, wherein said male coupler is mounted to the forward end of said vehicles by means of an attachment structure mounted to a forward end of said vehicles and including a pin received within a monoball element pivotally rotatably disposed in a second aperture defined in a rearward end of said male coupler; said monoball element providing said means for permitting relative roll, pitch and yaw.

11. A coupling assembly as in claim 7, further comprising spring means for centering said male coupler relative to said attachment structure.

12. A coupling assembly as in claim 1, wherein said control line terminal connectors include at least one projecting pin element mounted to a first plate member provided on and extending laterally from said male coupler and at least one tapered counterbore defined in a second plate member mounted adjacent to a rearward opening of said female coupler, each said pin element engaging a respective counterbore when said couplers engage and lock.

13. A coupling assembly as in claim 1, wherein said means for permitting relative roll, pitch and yaw include means for carrying the load of the front end of the vehicles.

14. A coupling assembly comprising:
   a male coupler;

a female coupler; one of said couplers adapted to be mounted on a rearward end of a leading vehicle, the other of said couplers being mounted on the forward end of an adjacent trailing vehicle;

means for automatically locking said male coupler within said female coupler when said male coupler is inserted into said female coupler;

sale male coupler including an attachment structure adapted for mounting said male coupler to one end of a vehicle and including an attachment pin received within an aperture in the rear end of said male coupler for connecting said male coupler and attachment structure;

an elastomeric bushing means disposed about said pin for permitting relative roll, pitch and yaw between vehicles and absorbing longitudinal compressive forces imposed thereon during coupling operations;

a bore in said elastomeric bushing means disposed between said attachment pin and said male coupler which contains a shock pad for assisting in the absorbing of said compression coupling forces; and a shock pad surrounding said attachment pin and between said male coupler and said attachment structure for absorbing some of the shocks and carrying a vehicle load.

15. A coupling assembly as in claim 14, wherein said female coupler and said male coupler each include control line terminal connector means such than when said female coupler and said male coupler engage and lock, the respective control line terminal connector means engage so as to enable communication therebetween.

16. A coupling assembly as in claim 14, wherein said means for automatically locking comprises a latch means operatively coupled to said female coupler so as to be urged into an interior space defined by said female coupler and a first aperture defined in a forward end of said male coupler which receives said latch means when said male coupler is fully inserted within said female coupler.

17. A coupling assembly as in claim 16, wherein said forward end of said male coupler includes at least one tapered face to facilitate insertion of said male coupler into said female coupler.

18. A coupling assembly as in claim 16, wherein said latch means includes an inclined rearward face so that when said male coupler is inserted into said female coupler, said male coupler engages said inclined face and depresses said latch means thereby enabling full insertion of said male coupler into said female coupler.

19. A coupling assembly as in claim 16, further comprising means for centering said male coupler relative to said attachment structure.

* * * * *